United States Patent
Lee

(10) Patent No.: US 9,646,752 B2
(45) Date of Patent: May 9, 2017

(54) MAGNETIC FIELD DISTRIBUTION CONTROL APPARATUS

(71) Applicant: HYUNDAI MOTOR COMPANY, Seoul (KR)

(72) Inventor: Heejin Lee, Daegu (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/964,542

(22) Filed: Dec. 9, 2015

(65) Prior Publication Data

US 2016/0093430 A1    Mar. 31, 2016

Related U.S. Application Data

(62) Division of application No. 14/133,336, filed on Dec. 18, 2013, now Pat. No. 9,236,174.

(30) Foreign Application Priority Data

Aug. 12, 2013    (KR) .......................... 10-2013-0095243

(51) Int. Cl.
| | | |
|---|---|---|
| H02J 7/02 | (2016.01) | |
| H01F 7/06 | (2006.01) | |
| H01F 21/04 | (2006.01) | |
| H01F 29/12 | (2006.01) | |
| H01F 38/14 | (2006.01) | |
| H02J 5/00 | (2016.01) | |

(52) U.S. Cl.
CPC ............ *H01F 7/06* (2013.01); *H01F 21/04* (2013.01); *H01F 29/12* (2013.01); *H01F 38/14* (2013.01); *H02J 5/005* (2013.01); *H02J 7/025* (2013.01)

(58) Field of Classification Search
CPC .. H02J 5/005; H02J 7/025; H02J 50/10; H02J 50/12; H02J 50/70
USPC .......................................... 336/130; 320/108
See application file for complete search history.

(56) References Cited

U.S. PATENT DOCUMENTS

| | | | |
|---|---|---|---|
| 4,891,558 A | 1/1990 | Tschuk | |
| 6,781,346 B2 | 8/2004 | Reinhard et al. | |
| 7,605,681 B2 | 10/2009 | Wobben | |
| 8,259,429 B2 | 9/2012 | Lee | |
| 2010/0314568 A1* | 12/2010 | Schenk | F16K 31/0655 251/129.15 |
| 2011/0298420 A1* | 12/2011 | Forsberg | A61N 1/3787 320/108 |

FOREIGN PATENT DOCUMENTS

| | | |
|---|---|---|
| JP | 07-264779 A | 10/1995 |
| JP | 2010-035297 A | 2/2010 |
| JP | 2010-041906 A | 2/2010 |

(Continued)

OTHER PUBLICATIONS

Non-final Office Action issued in related U.S. Appl. No. 14/133,336, mailed on Feb. 18, 2015.

(Continued)

*Primary Examiner* — Ramon M Barrera
(74) *Attorney, Agent, or Firm* — McDermott Will & Emery LLP

(57) ABSTRACT

A magnetic field distribution control apparatus includes a rod portion, a coil disposed at one side of an upper surface of the rod portion, and a ferrite movably disposed within the coil and configured to produce a magnetic field.

5 Claims, 6 Drawing Sheets

(56) References Cited

FOREIGN PATENT DOCUMENTS

| KR | 10-2011-0014714 A | 2/2011 |
| KR | 10-1094595 B1 | 12/2011 |
| KR | 10-2012-0086669 A | 8/2012 |

OTHER PUBLICATIONS

Notice of Allowance issued in related U.S. Appl. No. 14/133,336, mailed on Sep. 10, 2015.

* cited by examiner

MAGNETIC FIELD DISTRIBUTION CONTROL APPARATUS

CROSS-REFERENCE TO RELATED APPLICATION

This application is a Divisional of U.S. patent application Ser. No. 14/133,336, filed on Dec. 18, 2013, which in turn claims the benefit of priority to Korean Patent Application No. 10-2013-0095243 filed on Aug. 12, 2013, the entire contents of which are incorporated herein by reference.

TECHNICAL FIELD

The present inventive concept relates to a wireless power transmission technology, and particularly, to a magnetic field distribution control apparatus which changes a magnetic field distribution by shifting a position of a ferrite frame in a fixed coil using properties of a ferrite substance collecting magnetic flux.

BACKGROUND

Wireless power transmission is a technology which converts electrical energy into magnetic energy and transmits electric power without electric wires. Such a method transmits electric power based on electromotive force induced in a coil in a rod portion (e.g., battery) area, and this electromotive force is proportional to a magnetic flux interlinked with the coil. Therefore, the most important factor in determining transmission efficiency is to highly interlink magnetic flux produced by a coil in a power portion (e.g., charger) area with the coil in the rod portion (e.g., battery) area.

A transmitter using such wireless power transmission largely includes a coil, a ferrite, a variable capacitor, and the like. The ferrite is a substance which is largely used for wireless power transmission because it increases the size of a magnetic field and the inductance value of a coil.

The coil is used to induce the magnetic field while the ferrite is used to increase the size of the magnetic field. The variable capacitor is used to adjust a resonance in a drive frequency band by offsetting the inductance value of the coil.

Most ferrites used to increase the size of the magnetic field are fixed around the coil and thus the magnetic field has a fixed direction, as shown in FIGS. 1 and 2. Referring to FIG. 1, a ferrite 110 is fixed around a coil 120.

For a clear understanding, FIG. 2 is shown as a cross-sectional view taken along line I-I' in FIG. 1. Referring to FIG. 2, the coil 120 is placed on a rod portion 130 and the ferrite 110 is airtightly located inside the coil 120. Accordingly, a magnetic field 201 is concentrated only over the ferrite 110.

In other words, such a method has good efficiency if the coil in the rod portion (battery) area is placed at a given position for charging the rod portion, but has deteriorated efficiency if the coil in the rod portion area deviates from the given position.

SUMMARY

An aspect of the present inventive concept relates to a magnetic field distribution control apparatus which changes a magnetic field distribution by shifting a position of a ferrite frame in a fixed coil.

Other objects and advantages of the present inventive concept can be understood by the following description, and become apparent with reference to embodiments of the present inventive concept. The technical solution of the present inventive concept can be achieved by providing a magnetic field distribution control apparatus which changes a magnetic field distribution by shifting a position of a ferrite frame in a fixed coil.

An aspect of the present inventive concept encompasses a magnetic field distribution control apparatus including a rod portion, a coil disposed at one side of an upper surface of the rod portion, and a ferrite movably disposed within the coil and configured to produce a magnetic field.

The coil may be arranged in an annular form and the ferrite may have a circular shape.

A distribution direction of the produced magnetic field may be a direction upward from the ferrite.

A distribution direction of the produced magnetic field may vary according to movement of the ferrite.

Another aspect of the present inventive concept relates to a magnetic field distribution control apparatus including a rod portion, a first ferrite disposed at one side of an upper surface of the rod portion, a second ferrite disposed at one side of an upper surface of the first ferrite, a coil disposed at an inner side of the second ferrite, and a third ferrite movably disposed within the coil and configured to produce a magnetic field.

The coil may be arranged to come into contact with the inner side of the second ferrite.

The coil may be arranged in an annular form and the third ferrite may have a circular shape.

A distribution direction of the produced magnetic field may be a direction upward from the third ferrite.

A distribution direction of the produced magnetic field may vary according to movement of the third ferrite.

Still another aspect of the present inventive concept relates to a magnetic field distribution control apparatus including a rod portion, a plurality of ferrites, each of which is disposed at an upper surface of the rod portion to produce a magnetic field and has a groove, and a coil movably disposed within the groove.

The plural ferrites may be installed such that each of the ferrites is inserted into the rod portion to a certain depth and a bottom surface of the groove is flush with a surface of the rod portion.

The coil may be arranged in an annular form and the plural ferrites may be arranged in a circular form while each thereof has a horizontal bar shape.

A distribution direction of the produced magnetic field may be a direction upward from the plural ferrite.

A distribution direction of the produced magnetic field may vary according to movement of the coil.

Another aspect of the present inventive concept encompasses a transmitter including a magnetic field distribution control apparatus described above, and a capacitor to adjust a resonance in a drive frequency band by offsetting an inductance value of a coil.

DETAILED DESCRIPTION

Figure 1:
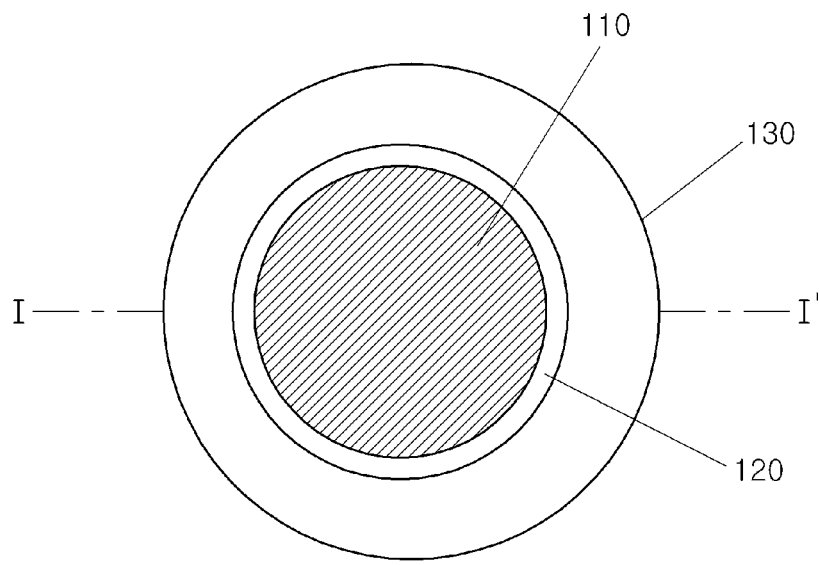
FIG. 1 is a top view typically illustrating a magnetic field distribution control apparatus for wireless power transmission using a ferrite.
Figure 2:
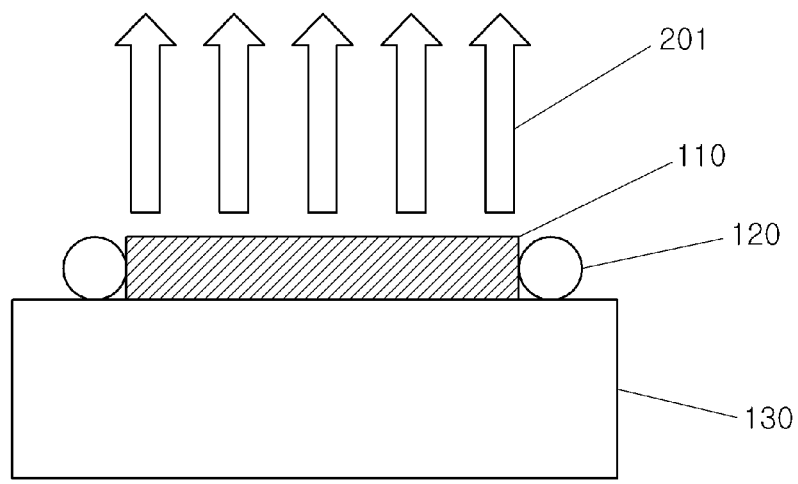
FIG. 2 is a cross-sectional view taken along line I-I' in FIG. 1.

A magnetic field distribution control apparatus for wireless power transmission according to exemplary embodiments of the present inventive concept will be described below in more detail with reference to the accompanying drawings. The present inventive concept may, however, be embodied in different forms and should not be construed as limited to the embodiments set forth herein. Rather, these embodiments are provided so that this disclosure will be thorough and complete, and will fully convey the scope of the present inventive concept to those skilled in the art. Throughout the disclosure, like reference numerals refer to like parts throughout the various figures and embodiments of the present inventive concept.

Figure 3:
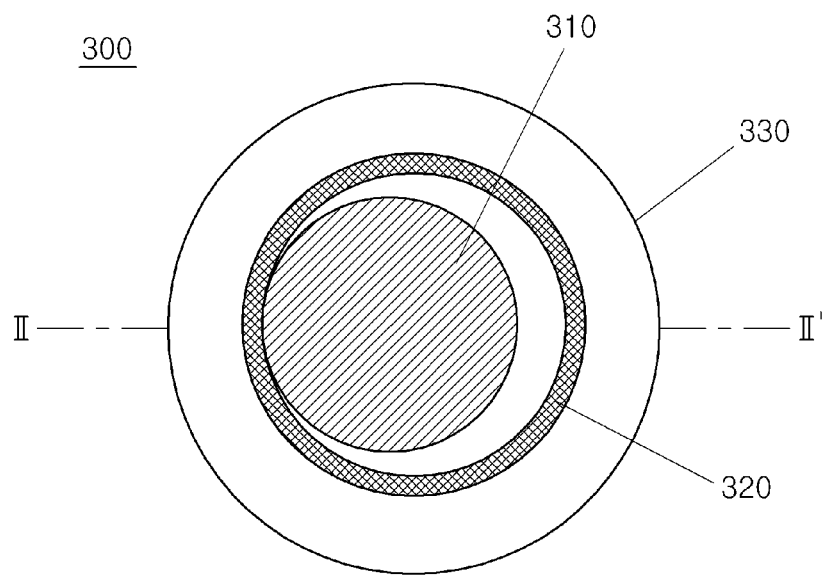
FIG. 3 is a top view illustrating a magnetic field distribution control apparatus for wireless power transmission in accordance with an embodiment of the present inventive concept.

FIG. 3 is a top view illustrating a magnetic field distribution control apparatus for wireless power transmission in accordance with an embodiment of the present inventive concept. Referring to FIG. 3, the magnetic field distribution control apparatus 300 may include a rod portion 330, a coil 320 disposed at one side of an upper surface of the rod portion 330, and a ferrite 310 which is movably disposed within the coil 320 and produces a magnetic field.

Figure 4:
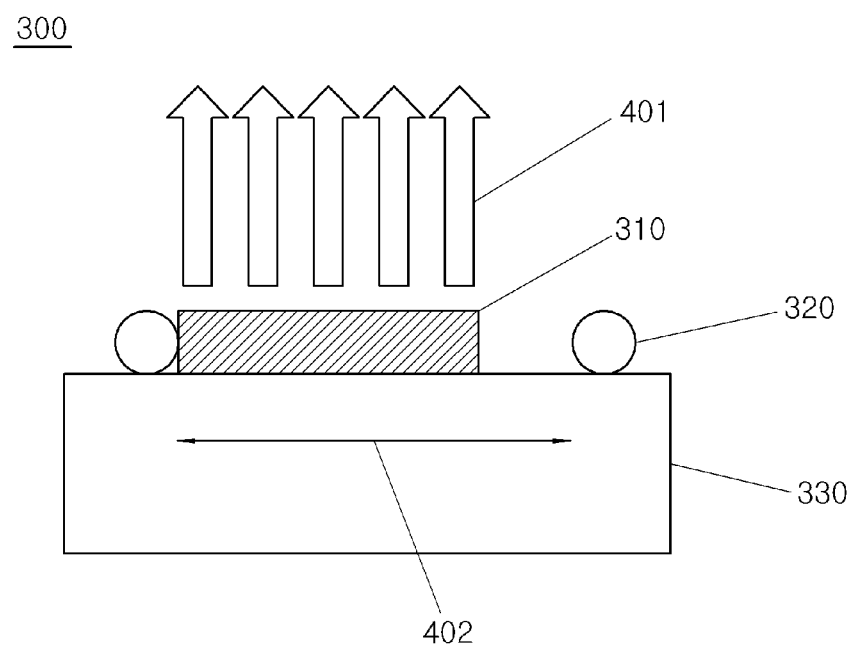
FIG. 4 is a cross-sectional view taken along line II-II' in FIG. 3.

FIG. 4 is a cross-sectional view taken along line II-II' in FIG. 3. Referring to FIG. 4, the rod portion 330, the ferrite 310, and the coil 320 may be located in serial order from the bottom. Particularly, FIG. 4 shows a state in which the ferrite 310 moves to the left side within the coil 320.

The rod portion 330 may be a battery part and may interlink a magnetic flux produced by a coil in a charger (not shown) area, which is a power portion, with the coil 320.

The ferrite 310 may move on the rod portion 330 as indicated by an arrow 402. That is, a space may be defined between the ferrite 310 and the coil 320 and the ferrite 310 may move within the space as occasion demands.

The direction of a magnetic field 401 may also vary according to movement of the ferrite 310. In FIG. 4, the distribution direction of the magnetic field 401 may be a direction upward from the ferrite 310. In other words, the distribution direction may be upward from an upper surface of the ferrite 310.

Although the coil 320 is arranged in an annular form in FIGS. 3 and 4, the present inventive concept is not limited thereto. For example, the coil 320 may be arranged in a triangular form, a square form, an octagonal form, or the like.

The ferrite 310 may also be formed in a triangular shape, a square shape, an octagonal shape, or the like as well as a circular shape so as to correspond to the form of the coil 320.

Figure 5:
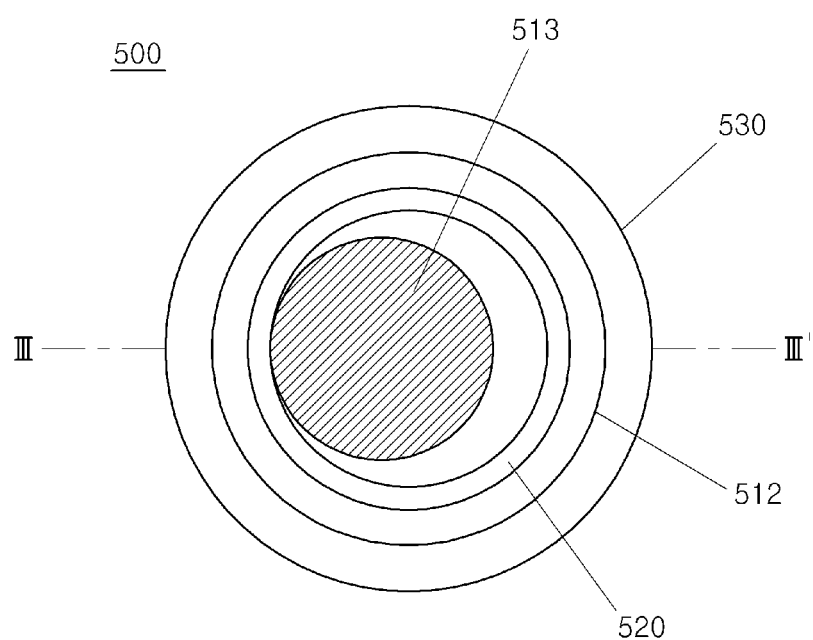
FIG. 5 is a top view illustrating a magnetic field distribution control apparatus for wireless power transmission in accordance with another embodiment of the present inventive concept.

FIG. 5 is a top view illustrating a magnetic field distribution control apparatus for wireless power transmission in accordance with another embodiment of the present inventive concept. Referring to FIG. 5, a second ferrite 512 and a third ferrite 513 may be disposed on a rod portion 530, and a coil 520 is disposed between the ferrites 512 and 513.

Figure 6:
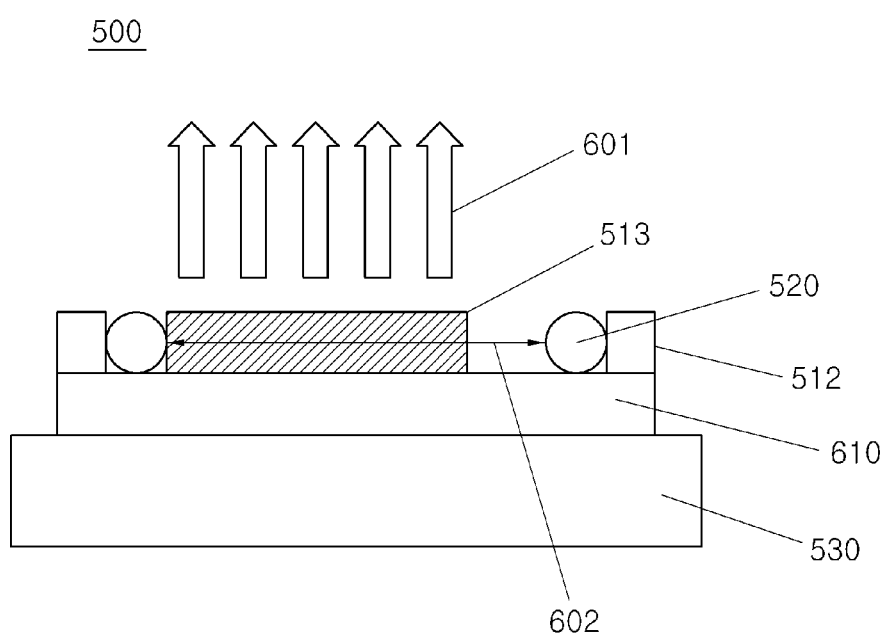
FIG. 6 is a cross-sectional view taken along line III-III' in FIG. 5.

FIG. 6 is a cross-sectional view taken along line III-III' in FIG. 5. Referring to FIG. 6, a magnetic field distribution control apparatus 500 may include the rod portion 530, a first ferrite 610 disposed at one side of an upper surface of the rod portion 530, the second ferrite 512 disposed at one side of an upper surface of the first ferrite 610, the coil 520 disposed inside the second ferrite 512, and the third ferrite 513 which is movably disposed within the coil and produces a magnetic field.

Referring to FIG. 6, the rod portion 530, the first ferrite 610, the second ferrite 512, the third ferrite 513, and the coil 520 may be located in serial order from the bottom. In addition, the coil 520 may be placed between the second ferrite 512 and the third ferrite 513. Particularly, FIG. 6 shows a state in which the third ferrite 513 moves to the left side within the coil 520.

The rod portion 530 may be a battery part and may interlink a magnetic flux produced by a coil in a charger (not shown) area, which is a power portion, with the coil 520.

The third ferrite 513 may move on the first ferrite 610 as indicated by an arrow 602. That is, a space may be defined between the third ferrite 513 and the coil 520 so that the third ferrite 513 may move within the space as occasion demands.

The coil 520 may be arranged to come into contact with an inner surface of the second ferrite 512 for such a space.

The direction of a magnetic field 601 may also vary according to movement of the third ferrite 513. In FIG. 6, the distribution direction of the magnetic field 601 may be a direction upward from the third ferrite 513. In other words, the distribution direction may be upward from an upper surface of the third ferrite 513.

Although the coil 520 is arranged in an annular form in FIGS. 5 and 6, the present inventive concept is not limited thereto. For example, the coil 520 may be arranged in a triangular form, a square form, an octagonal form, or the like.

Each of the ferrites 512 and 513 may also be formed in a triangular shape, a square shape, an octagonal shape, or the like, as well as a circular shape so as to correspond to the form of the coil 520.

Figure 7:
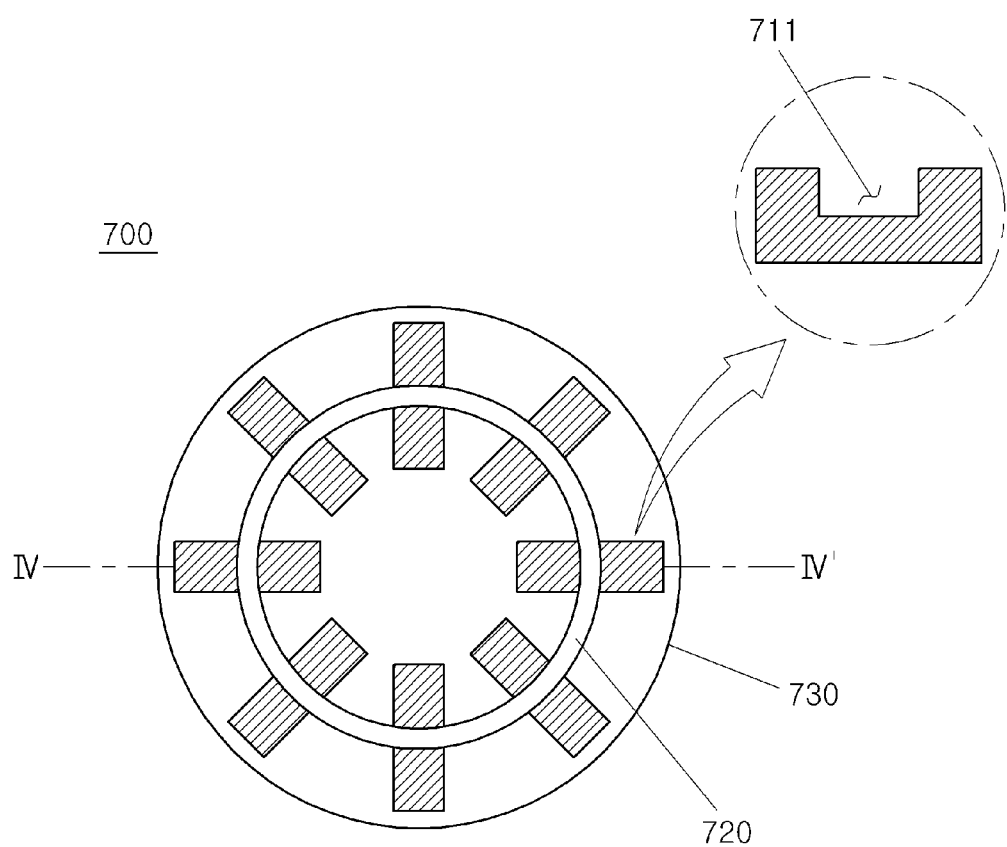
FIG. 7 is a top view illustrating a magnetic field distribution control apparatus for wireless power transmission in accordance with a further embodiment of the present inventive concept.

FIG. 7 is a top view illustrating a magnetic field distribution control apparatus for wireless power transmission in accordance with a further embodiment of the present inventive concept. Referring to FIG. 7, a magnetic field distribution control apparatus 700 may include a rod portion 730, a plurality of ferrites 710-1, 710-2, and a coil 720. Each of the ferrites 710-1, 710-2 may be disposed at an upper surface of the rod portion 730 to produce a magnetic field and may have a groove 711, so that the coil 720 is movably disposed within the groove 711.

Figure 8:
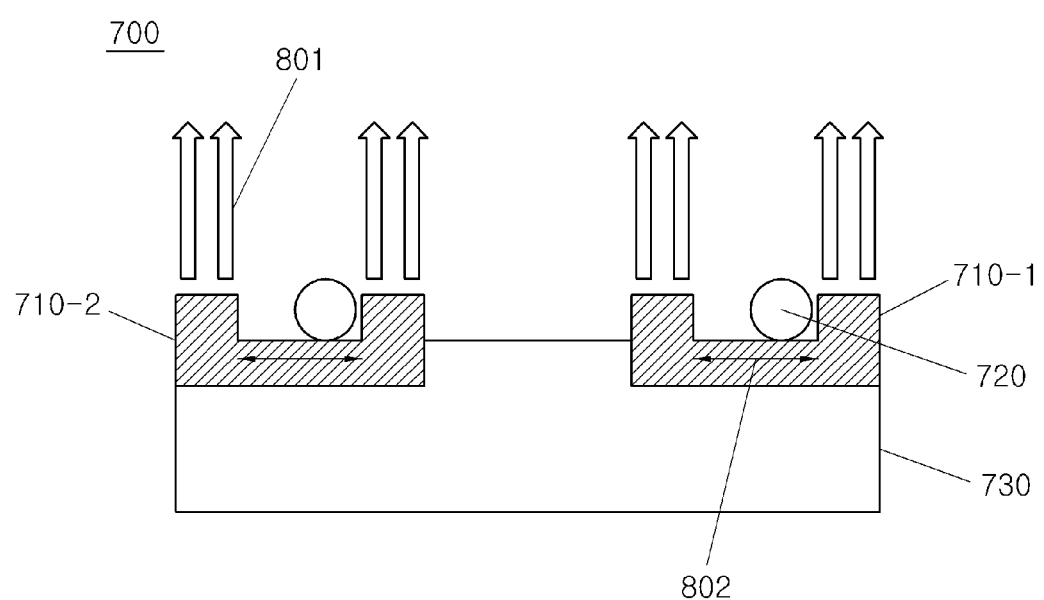
FIG. 8 is a cross-sectional view taken along line IV-IV' in FIG. 7.

FIG. 8 is a cross-sectional view taken along line Iv-IV in FIG. 7. Referring to FIG. 8, the rod portion 730, ferrites 710-1 and 710-2, and the coil 720 may be located in serial order from the bottom.

Unlike the embodiments shown in FIGS. 3 to 6, the coil 720 may move within each of the ferrites 710-1, 710-2 in FIG. 8. In other words, the coil 720 may move within the groove 711 formed in each of the ferrites 710-1, 710-2.

Particularly, FIG. 8 shows a state in which the coil 720 moves to the most right side within the groove 711.

The rod portion 730 may be a battery part and may interlink a magnetic flux produced by a coil in a charger (not shown) area, which is a power portion, with the coil 720.

The coil 720 may move within the groove 711 formed in the ferrite 710-1, 710-2 as indicated by an arrow 802. That is, a space may be defined in the groove 711 formed in the ferrite 710-1, 710-2 and the coil 720 may move within the space as occasion demands.

Each of the ferrites 710-1, 710-2 may be installed so as to be inserted into the rod portion 730 to a certain depth. In other words, each of the ferrites 710-1, 710-2 may be installed such that a bottom surface of the groove 711 is flush with a surface of the rod portion 730.

In addition, the coil 720 may be arranged in an annular form. The plural ferrites 710-1, 710-2 may be arranged in a circular form while each thereof has a horizontal bar shape. The ferrites 710-1, 710-2 may also be arranged in a triangular form, a square form, an octagonal form, or the like Referring to FIG. 8, the distribution direction of a magnetic field 801 produced according to movement of the coil 720 may be a direction upward from the plural ferrites 710-1, 710-2.

The distribution direction of the produced magnetic field may vary according to movement of the coil 720. In a case of FIG. 8, the distribution intensity of the magnetic field may be changed according to movement of the coil 720. In other words, in FIG. 8, when the coil 720 moves to the right side, the distribution intensity of the magnetic field may be high at a right section of the first ferrite 710-1, compared with a left section thereof. The second ferrite 710-2 may also be applied similarly to the above case.

Meanwhile, according to a further embodiment of the present inventive concept, a transmitter for wireless power transmission may include the above-mentioned magnetic field distribution control apparatus 300, 500, or 700. A capacitor (not shown) may be provided to adjust a resonance in a drive frequency band by offsetting an inductance value of a coil.

In accordance with the exemplary embodiments of the present inventive concept, it may be possible to interlink a large amount of magnetic flux with a coil on a rod portion by changing a magnetic field distribution.

In addition, a plurality of rod portions may be intensively or evenly charged by a change in magnetic field distribution during charging thereof.

While the present inventive concept has been described with respect to the specific embodiments, it will be apparent to those skilled in the art that various changes and modifications may be made without departing from the spirit and scope of the inventive concept as defined in the following claims.

What is claimed is:

1. A magnetic field distribution control apparatus, comprising:
   a rod portion;
   a coil disposed at one side of an upper surface of the rod portion; and
   a ferrite disposed to be movable radially in all directions within the coil and configured to produce a magnetic field,
   wherein a distribution direction of the produced magnetic field varies according to movement of the ferrite, and
   wherein the distribution direction of the produced magnetic field is a direction upward from the ferrite.

2. The magnetic field distribution control apparatus of claim 1, wherein the coil is arranged in an annular form and the ferrite has a circular shape.

3. A magnetic field distribution control apparatus, comprising:
   a rod portion;
   a first ferrite disposed at one side of an upper surface of the rod portion;
   a second ferrite disposed at one side of an upper surface of the first ferrite;
   a coil disposed at an inner side of the second ferrite; and
   a third ferrite disposed to be movable radially in all directions within the coil and configured to produce a magnetic field,
   wherein a distribution direction of the produced magnetic field varies according to movement of the third ferrite, and
   wherein the distribution direction of the produced magnetic field is a direction upward from the third ferrite.

4. The magnetic field distribution control apparatus of claim 3, wherein the coil is arranged to come into contact with the inner side of the second ferrite.

5. The magnetic field distribution control apparatus of claim 3, wherein the coil is arranged in an annular form and the third ferrite has a circular shape.

* * * * *